Feb. 26, 1957

W. E. SAXE 2,782,926

APPARATUS FOR MEASURING FINENESS MODULUS

Filed Feb. 26, 1951

INVENTOR.
WALTER E. SAXE
BY HIS ATTORNEYS.
HARRIS, KIECH, FOSTER & HARRIS

INVENTOR.
WALTER E. SAXE
BY HIS ATTORNEYS.
HARRIS, KIECH, FOSTER & HARRIS

Feb. 26, 1957 W. E. SAXE 2,782,926
APPARATUS FOR MEASURING FINENESS MODULUS
Filed Feb. 26, 1951 8 Sheets-Sheet 3

INVENTOR.
WALTER E. SAXE
BY HIS ATTORNEYS.
HARRIS, KIECH, FOSTER & HARRIS

Feb. 26, 1957 W. E. SAXE 2,782,926
APPARATUS FOR MEASURING FINENESS MODULUS
Filed Feb. 26, 1951 8 Sheets-Sheet 4

INVENTOR.
WALTER E. SAXE
BY HIS ATTORNEYS.
HARRIS, KIECH, FOSTER & HARRIS

Feb. 26, 1957 W. E. SAXE 2,782,926
APPARATUS FOR MEASURING FINENESS MODULUS
Filed Feb. 26, 1951 8 Sheets-Sheet 5

Fig.14.

INVENTOR.
WALTER E. SAXE
BY HIS ATTORNEYS.
HARRIS, KIECH, FOSTER & HARRIS

Feb. 26, 1957 W. E. SAXE 2,782,926
APPARATUS FOR MEASURING FINENESS MODULUS
Filed Feb. 26, 1951 8 Sheets-Sheet 6

Fig.15.

INVENTOR.
WALTER E. SAXE
BY HIS ATTORNEYS.
HARRIS, KIECH, FOSTER & HARRIS

INVENTOR.
WALTER E. SAXE,
By His Attorneys.
HARRIS, KIECH, FOSTER & HARRIS.

United States Patent Office 2,782,926
Patented Feb. 26, 1957

2,782,926

APPARATUS FOR MEASURING FINENESS MODULUS

Walter E. Saxe, Pasadena, Calif., assignor to The Conveyor Company, Inc., Los Angeles, Calif., a corporation of California Application February 26, 1951, Serial No. 212,780

8 Claims. (Cl. 209—237)

The present invention relates in general to an apparatus for measuring automatically a modulus of a material which is indicative of the proportions of components or fractions of the material, such fractions differing from each other in the value of some common characteristic. For example, the fractions may have different values of volume or weight, or may include particles of differing size or fineness.

The invention finds particular utility in an apparatus for determining the fineness modulus of a material such as sand which includes a plurality of constituents or fractions of differing fineness, and will be considered in such connection herein as a matter of convenience, although it will be understood that the invention is susceptible of other applications.

As is well known, different types of concrete require different sand finenesses, depending upon the use to be made of the concrete. The sand used in concrete is graded by means of screens, each grade including those particles which will pass through a specified screen, but which will not pass through a screen of finer mesh. However, sand graded in this manner may vary considerably. For example, a particular grade of sand from one source may contain larger proportions of finer fractions than the same grade obtained from another source. Thus, the specimen having the larger proportions of finer fractions is, in effect, finer than the other, even though the grades of the two specimens are the same.

Because of such variations in the effective fineness of sands of the same grade from different sources, an arbitrary system of describing the physical composition of sand has been adopted. Essentially this system involves assigning to the particular sand in question an arbitrary number which is termed the fineness modulus of such sand and which is indicative of the proportions of the constituents or fractions of the sand, each constituent or fraction being regarded as a relatively small range of particle sizes. In order to determine the fineness modulus of a particular sand in accordance with this arbitrary system, it is necessary to determine the percentages of the various fractions of which the sand is composed, these fractions then being differently adjusted or weighted to obtain weighted values thereof which are totaled to obtain the fineness modulus. More particularly, progressively decreasing weights are assigned to the percentage values of the fractions in the order of increasing fineness of the fractions to obtain the foregoing weighted values, the finest fraction being weighted by a factor of zero so that it does not enter into the fineness modulus.

In actual practice, the determination of the fineness modulus of a particular sand requires the use of a plurality of screens of differing mesh each of which will retain one of the sand fractions and any coarser fractions. With the arbitrary system which has been adopted for general use, six screens of differing mesh, viz., four, eight, sixteen, thirty, fifty and one hundred, are employed, the fineness modulus being determinable with such a set of screens in either of two general ways.

Considering the first of these general ways of obtaining the fineness modulus of sand with such a set of screens, a sample of the sand is placed on the four-mesh screen and the percentage retained, which may be regarded as the coarsest fraction of the sand, is measured. The sand passing through the four-mesh screen is then placed on the eight-mesh screen and the percentage retained again measured. This process is repeated until the percentages retained by all of the screens have been determined, the percentage passing through the finest, or one hundred-mesh screen, also being measured if desired. The percentages thus obtained of course add up to one hundred. The fineness modulus of the said is obtained from these percentages by assigning progressively decreasing weights to the percentages in the order of increasing fineness of the fractions to obtain weighted values of the fractions, the weighted values subsequently being totaled and divided by one hundred to obtain the fineness modulus. The weighted values of the percentages are obtained by applying a factor of six to the percentage retained by the four-mesh screen, a factor of five to the percentage retained by the eight-mesh screen, a factor of four to the percentage retained by the sixteen-mesh screen, a factor of three to the percentage retained by the thirty-mesh screen, a factor of two to the percentage retained by the fifty-mesh screen, a factor of one to the percentage retained by the one hundred-mesh screen, and a factor of zero to the percentage passing through the one hundred-mesh screen. This may be done in either of two ways. First, the percentages retained may be cumulatively totaled, starting with the percentage retained by the four-mesh screen and omitting the percentage passing through the one hundred-mesh screen. Such cumulative totals are then summed up to obtain a grand total which is divided by one hundred to obtain the fineness modulus. The second way is to multiply the percentages retained by the various screens by the factors discussed above, such weighted percentages then being totaled and divided by one hundred to obtain the fineness modulus. It is thought that these procedures may best be illustrated by way of the following example:

| Screen mesh | Percentage retained | Cumulative totals of percentages | Weighted percentages |
|---|---|---|---|
| 4 | 1 | 1 | 6 |
| 8 | 18 | 19 | 90 |
| 16 | 20 | 39 | 80 |
| 30 | 19 | 58 | 57 |
| 50 | 18 | 76 | 36 |
| 100 | 16 | 92 | 16 |
|  | [1] 8 |  |  |
| Totals | 100 | 285 | 285 |

[1] Percentage passing through one hundred-mesh screen.

As will be apparent, the first item in the column headed "Cumulative totals of percentages" is the percentage retained by the four-mesh screen, the second is the percentage retained by the four-mesh screen plus that retained by the eight-mesh screen, the third is the percentage retained by the sixteen-mesh screen plus the percentages retained by the four-mesh and the eight-mesh screens, and so forth. In the column headed "Weighted percentages," the first item is the percentage retained by the four-mesh screen multiplied by a factor of six, the second is the percentage retained by the eight-mesh screen multiplied by five, and so forth. The totals of these two columns are the same, viz., 285, this number, when divided by one hundred, being the fineness modulus, the fineness modulus in the particular example illustrated being 2.85.

Considering the second general way of obtaining the fineness modulus with such a set of screens, the sand sample may be divided into six equal parts which are placed on the respective screens independently of each other. In this way, the four-mesh screen retains the coarsest fraction, the eight-mesh screen retains the coarsest fraction and the second fraction in the series, the sixteen-mesh screen retains the first three fractions, the thirty-mesh screen retains the first four fractions, the fifty-mesh screen retains the first five fractions, and the one hundred-mesh screen retains all of the fractions except the very finest, which passes through the one hundred-mesh screen. When the fractions retained by all six screens are measured and the total percentage thereof with respect to the amount of sand placed on any one of the screens is determined, the resulting percentage is again one hundred times the fineness modulus. In effect, what happens with this procedure is that the various screens retain cumulative totals of the fractions which are too coarse to pass therethrough. In other words, referring back to the example cited in the table above, when equal amounts of sand are placed on the six screens independently, the four-mesh screen retains one percent of the amount of sand placed thereon, the eight-mesh screen retains nineteen percent of the sand placed thereon, the sixteen-mesh screen retains thirty-nine percent of the amount of sand placed thereon, and so forth, the total of such percentages being 285, which, when divided by one hundred to obtain 2.85, is the fineness modulus of the sand.

Thus, it will be seen that whichever of the foregoing procedures is followed, the resulting fineness modulus is always the same for a particular sand. As will be apparent, a sand having large proportions of coarse fractions will have a higher numerical value of fineness modulus because the percentages of the coarse fractions are weighted more heavily. Conversely, a sand having large proportions of fine fractions will have a lower numerical value of fineness modulus because the percentages of the finer fractions are weighted less heavily.

It will be understood that the foregoing numerical example is purely illustrative and that the invention is not in any way to be limited thereto. Also, it will be understood that, as pointed out above, the numerical value obtained for the fineness modulus with the set of screens and weighting factors discussed is entirely arbitrary and that the invention is therefore not to be regarded as limited specifically thereto. For example, the number of screens, the meshes of the screens, the weighting factors, and so forth, depend entirely on the arbitrary system for arriving at the fineness modulus which has been discussed above. Any or all of these values may be varied without departing from the spirit of the invention. In other words, the invention is equally applicable to measuring fineness modulus by some other arbitrary set of standards and, therefore, it will be understood that I do not intend to be limited to the arbitrary set of standards discussed above.

Considering the present invention in more detail in the light of the foregoing, a general object thereof is to provide an apparatus for measuring a modulus of a multi-fraction material which is indicative of the relative proportions of the fractions and, more particularly, to provide an apparatus for measuring the fineness modulus of a material such as sand which includes progressively finer fractions.

An object of the invention of primary importance is to provide an apparatus for measuring the fineness modulus of a material such as sand completely automatically so as to avoid any necessity for manual manipulations and computations on the part of an operator.

In other words, a primary object of the invention is to provide an apparatus for measuring fineness modulus which includes means for assigning different weights to the fractions of the material and means for automatically totaling the resulting weighted values to obtain the fineness modulus, or a quality proportional thereto.

Another object is to provide such an apparatus which operates continuously so that a stream of the sand or other material whose fineness modulus is to be measured may be delivered thereto and a continuous measurement of the fineness modulus obtained.

Another object in this connection is to provide in conjunction with an apparatus for measuring the fineness modulus continuously a splitting means for continuously sampling a main stream of the material and for delivering the resulting sample stream to the apparatus for measuring the fineness modulus so that such apparatus needs operate only on a sample stream of the material, rather than on the entire stream.

Another object of the invention is to provide such an apparatus having means for totaling the unweighted values of the fractions, as well as the weighted values thereof, and having means for indicating the unweighted values of the individual fractions, preferably in terms of the percentages thereof.

An important object is to provide means for maintaining substantially constant the indication of the total of the unweighted values so that the indications of the unweighted values of the individual fractions are always the percentages of the individual fractions, or readily convertible thereto.

An object in connection with one embodiment of the invention is to provide such a means for maintaining the indication of the total of the unweighted values of the fractions substantially constant which includes means for maintaining substantially constant the sample stream of the material delivered to the apparatus for measuring the fineness modulus of the material. An object in connection with another embodiment is to provide such a means which includes means responsive to any variations in the indication of the total of the unweighted values of the fractions from a prescribed value for continuously adjusting the indications of the unweighted values of the individual fractions to maintain such indications equal to the percentages of the respective fractions.

So long as the indication of the total of the unweighted values of the fractions is maintained substantially constant in either of the foregoing ways, the fineness modulus indication is always correct irrespective of variations in the volume of the main stream delivered to the splitting or sampling means, which is an important feature of the invention.

Another object in connection with one embodiment of the invention is to provide an apparatus wherein the means for automatically assigning different weights to the values of the fractions includes a system of screens so arranged that each screen retains only one fraction, and includes means for multiplying the values of the fractions so retained by suitable factors to obtain weighted values which are subsequently totaled to obtain the fineness modulus. An object in connection with another embodiment is to provide an apparatus wherein the means for automatically assigning different weights to the values of the fractions includes a system of screens and means for delivering equal amounts of the material to the screens independently of each other so that each screen retains a specified fraction and all coarser fractions, the total value of all of the fractions retained by all of the screens thus being proportional to the fineness modulus so that, in this instance, the screens themselves act to assign different weights to the values of the fractions, which is an important feature of the invention.

Another object is to provide an apparatus in which the fractions of the material are completely isolated or separated from each other and which includes a multiplying mechanism for multiplying the values of the respective fractions so separated by appropriate weighting factors to obtain the fineness modulus of the material. A related object is to provide such an apparatus wherein the separated fractions are delivered to receptacles which are connected to a beam means different distances from a fulcrum means on which the beam means is pivotally mounted so that the values of the respective fractions are multiplied by different factors to obtain weighted values which are then totaled automatically to obtain the fineness modulus. Still another object in this connection is to provide such an apparatus wherein the receptacles are connected independently of such beam means to a means for measuring the total of the unweighted values of the fractions.

Another object is to provide such an apparatus which includes a watthour meter controlled by the means for indicating the fineness modulus of the material to integrate the fineness modulus with respect to time so that the average fineness modulus for any period of time, such as eight hours, for example, may be determined by dividing the reading of the watthour meter by the number of hours in the interval.

Although, as hereinbefore indicated, the values of the fractions may be based on various characteristics thereof, such as volume, weight, and the like, I prefer to base the values of the fractions on weight as a matter of convenience and the exemplary embodiments disclosed in detail hereinafter operate on a weight basis. Thus, ordinary scales may be employed for the fineness modulus indicator, the indicator of the total of the unweighted values of the fractions, the indicators of the unweighted values of the individual fractions, and the like, which is an important feature of the invention. Preferably, the fineness modulus scale is calibrated in terms of fineness modulus, instead of units of weight, and the scales for indicating the total of the unweighted values of the fractions and the values of the individual fractions are preferably calibrated in terms of percentages. Thus, any necessity for converting readings is avoided.

It might be well to point out here that, in order to avoid confusion, the reader must keep in mind that the term "weight" is used in two different senses hereinafter. For example, in referring to the "weighted value" of a fraction, it is meant that such fraction has been adjusted or weighted by assigning to it a particular "weight" or "importance," as by multiplying it by a given "weighting" factor, or by including it in the total a number of times equal to the "weighting" factor. On the other hand, the term "weight" is also used in the more customary sense. For example, in referring to the percentage of a fraction by "weight," it is meant that the percentage of such fraction has been derived by dividing the physical weight of the fraction in pounds, or other units, by the physical weight in pounds, or other units, of all of the fractions and by multiplying the result by one hundred.

The objects and advantages of the invention hereinbefore discussed, together with various other objects and advantages thereof which will become apparent, may be attained with the exemplary embodiments of the invention which are illustrated in the accompanying drawings and which are described in detail hereinafter. Referring to the drawings.

Figures 1, 2, 3:
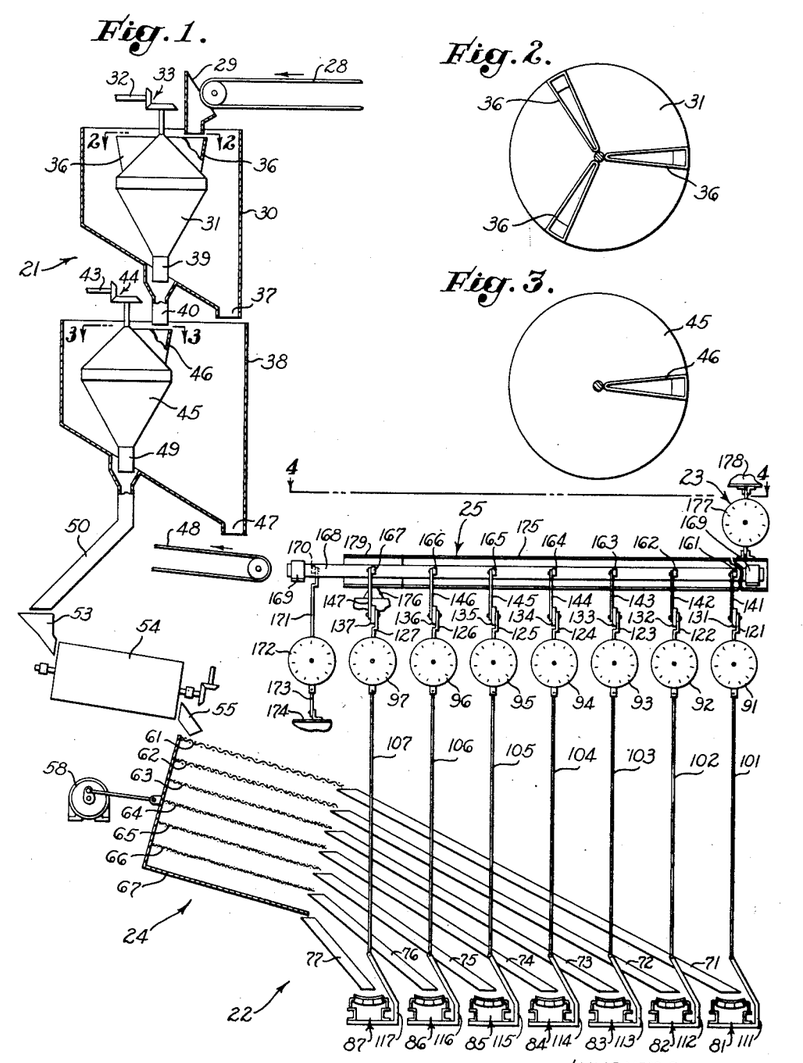
Fig. 1 is a semi-diagrammatic elevation of one embodiment of an apparatus of the invention.
Figs. 2, 3 and 4 are enlarged, fragmentary views respectively taken as indicated by the arrowed lines 2—2, 3—3 and 4—4 of Fig. 1.

Referring particularly to Fig. 1 of the drawings, the embodiment illustrated therein includes in general, splitting means 21 for obtaining from a main stream of sand, or other material whose fineness modulus is to be measured, a sample stream which is delivered to means 22 for differently weighting the values of the fractions of the sand to obtain weighted values thereof which are summed up by a totaling means 23 to obtain the fineness modulus of the sand. In the particular embodiment under consideration, the weighting means 22 includes a screen system 24 which separates the various fractions of the sand from each other, and includes multiplying means 25 for multiplying the values of the fractions by different weighting factors to obtain the aforementioned weighted values thereof.

Considering this embodiment in more detail, a conveyor 28 delivers a main stream of sand to a spout 29 which is positioned above a hopper 30 to discharge the main stream of sand thereinto. Positioned in the hopper 30 is a rotatable splitter 31 which forms one element of the splitting means 21 and which may be driven by a shaft 32 through gearing 33, for example. The splitter 31 is hollow and is provided with a conical upper end on which are mounted three sector-shaped compartments 36 communicating at their lower ends with the interior of the splitter. As will be apparent, the main stream of sand discharged by the spout 29 enters each of the sector-shaped compartments 36 once for each revolution of the splitter 31 and is discharged into the interior of such splitter, the remainder of the main stream of sand spilling off the conical upper end of the splitter 31 into the hopper 30 and through a spout 37 at the bottom of this hopper into a hopper 38 therebelow. The sand split off by the sector-shaped compartments 36 and entering the interior of the splitter 31 discharges therefrom through a spout 39 into a spout 40 at the bottom of the upper hopper 30. Rotatable in the lower hopper 38, and driven by a shaft 43 through gearing 44, for example, is another splitter 45 which is also an element of the splitting means 21. This splitter is similar to the splitter 31, being provided with a conical upper end which carries a single sector-shaped compartment 46 in the particular construction illustrated. The interior of the splitter 45 is also hollow and the sector-shaped compartment 46 discharges thereinto. As will be apparent, once during each revolution of the splitter 45, the sand split off by the upper splitter 31 and discharging into the lower hopper 38 through the spout 40 enters the sector-shaped compartment 46 and is discharged into the interior of the lower splitter 45.

The sand spilling off the conical upper end of the lower splitter 45 discharges into the hopper 38 and mixes with the sand discharged thereinto from the hopper 39 thereabove, such sand escaping from the lower hopper 38 through a spout 47 which discharges onto a conveyor 48 leading to a suitable point of disposal or storage. The sand entering the interior of the lower splitter 45 escapes through a spout 49 thereon into a spout 50 at the bottom of the lower hopper 38.

Thus, the splitting means 21 divides the main stream delivered by the conveyor 28 into a sample stream delivered to the spout 50 and a residual stream delivered to the conveyor 48, the sample stream being delivered to the weighing means 22 as will be discussed in more detail in the following paragraphs. Preferably, the sample stream is but a very small percentage of the main stream. For example, and without limiting the invention thereto, if the conveyor 28 delivers sand at a rate of one hundred and eighty (180) tons per hour, the flow in the sample stream may be of the order of one thousand (1,000) pounds per hour. As will be apparent, this may be accomplished by splitting off one-twelfth (1/12) of the main stream with the splitter 31 and by splitting off one-thirtieth (1/30) of such one-twelfth (1/12) with the lower splitter 45. This would require an angle of ten degrees (10°) for each of the sector-shaped compartments 36 of the upper splitter 31, and an angle of twelve degrees (12°) for the sector-shaped compartment 46 of the lower splitter 45. However, it will be understood that these angles may be any desired values. Also, the number of sector-shaped compartments on the two splitters may be varied, as may be the number of splitters.

It will be understood that by rotating the splitters 31 and 45 at sufficiently high speeds a substantially continuous sample stream may be obtained, assuming that the original or main stream is more or less continuous. Also, increased continuity of the sample stream may be obtained by increasing the number of sector-shaped compartments on each splitter.

If the sand is dry, the sample stream may be delivered directly to the screen system 24 by the spout 50. Otherwise, the spout 50 may discharge into a hopper 53 which delivers it to a dryer 54, the latter discharging into a chute 55 which delivers the sand to the screen system 24. It will be understood that it is not necessary that the sand be dry since, if wet, it may be weighed under water, as will be disclosed in an embodiment to be described hereinafter.

The screen system 24, which may be vibrated by a vibrating device 58, for example, comprises a stack of screens 61, 62, 63, 64, 65 and 66 arranged one below the other in the order enumerated. Below the lowermost screen 66 in the stack is a pan 67 which retains any sand passing through the screen 66. It will be noted that the screen system 24 is shown as including six screens in accordance with the arbitrary standards hereinbefore discussed, although the number of screens may be varied if other standards are followed. Also, in accordance with the arbitrary standards hereinbefore discussed, the screens 61, 62, 63, 64, 65 and 66 are four-mesh, eight-mesh, sixteen-mesh, thirty-mesh, fifty-mesh and one hundred-mesh screens, respectively.

The sample stream of sand delivered to the screen system through the chute 55 is discharged onto the uppermost screen 61, some of the sand being retained by the uppermost screen and the rest passing therethrough onto the second screen 62. The latter retains some of the sand passing through the uppermost screen 61, the remainder passing therethrough onto the third screen 63. Similarly, the third, fourth, fifth, and sixth screens 63, 64, 65 and 66 retain portions of the sand, any sand too fine to be retained by the one hundred-mesh screen 66 being retained by the pan 67. Thus, it will be seen that the screen system 24 separates the sample stream of sand into seven components or fractions, each fraction being composed of a particular range of particle sizes. For example, the fraction retained by the uppermost screen 61 is the coarsest fraction and is composed of those particles which are too large to pass therethrough. Similarly, the fraction retained by the second screen 62 is the next finer fraction and is composed of those particles which are small enough to pass through the screen 61 but too large to pass through the screen 62, and so forth.

The screens 61, 62, 63, 64, 65 and 66 and the pan 67 are inclined so that the respective fractions retained thereby continuously spill over into chutes 71, 72, 73, 74, 75, 76 and 77, respectively, in substantially continuous streams. The chutes 71, 72, 73, 74, 75, 76 and 77 discharge the respective fractions into receptacles which are illustrated as continuously moving conveyors 81, 82, 83, 84, 85, 86 and 87, respectively, the conveyors being driven at the same speed in any suitable manner, as by electric motors, not shown, mounted thereon. The conveyors 81 to 87 are operatively connected to scales 91 to 97, respectively, in any suitable manner such that the indications on the scales are at least proportional to the weights of the fractions on the respective conveyors. For purposes of illustration, the scales 91 to 97 are illustrated as supporting the conveyors 81 to 87 through links 101 to 107 and hangers 111 to 117, respectively, the hangers supporting the conveyors and the links being pivotally connected to the hangers and the scales. The conveyors 81 to 87 may discharge onto a cross conveyor, not shown, which leads to a suitable point of disposal or storage, such as the point of disposal or storage to which the conveyor 48 for the residual stream leads.

Although the scales 91 to 97 may be calibrated in any suitable units, such as units of weight, for example, they are preferably calibrated in percentage so that each scale indicates the percentage value of the fraction on the corresponding conveyor. Thus, the percentages of the various fractions by weight may readily be determined without conversion.

Figure 4:
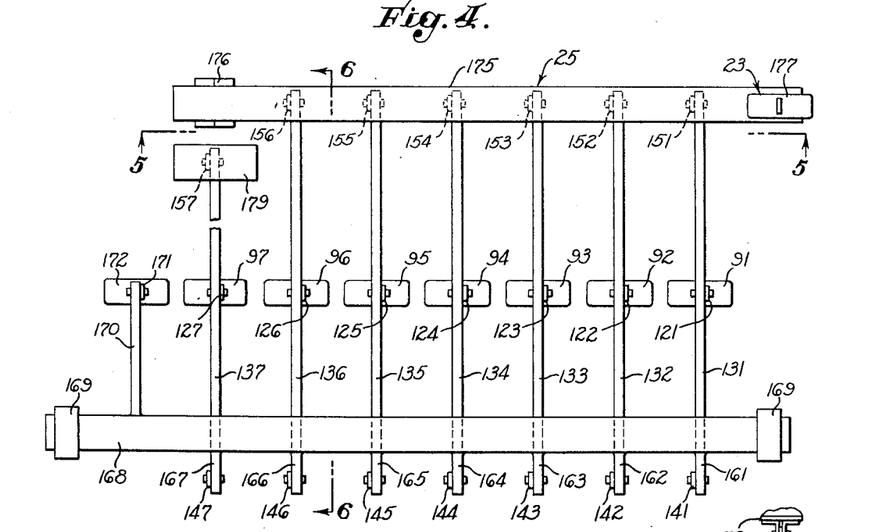
Figure 5:
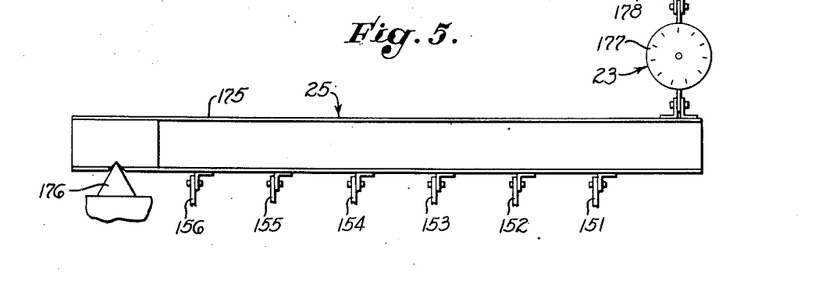
Figs. 5 and 6 are fragmentary sectional views respectively taken as indicated by the arrowed lines 5—5 and 6—6 of Fig. 4.
Figure 6:
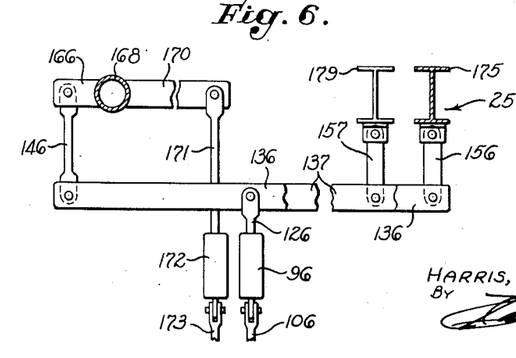

The scales 91 to 97 are supported by links 121 to 127, respectively, which are pivotally connected to generally horizontal bars 131 to 137, respectively, such bars being best shown in Figs. 4 and 6 of the drawings. As viewed in the drawings, the forward ends of the bars 131 to 137 are supported by links 141 to 147, respectively, pivotally connected thereto, and the rearward ends of the bars are supported by links 151 to 157, respectively, pivotally connected thereto. The links 141 to 147 at the forward ends of the bars 131 to 137 are pivotally connected to conveyor arms 161 to 167, respectively, which are rigidly connected to and extend radially from one side of a shaft 168 which is rotatably mounted in bearings 169. Extending radially from the opposite side of the shaft 169 is a scale arm 170 to which is pivotally connected the upper end of a link 171, the lower end of such link being pivotally connected to a total scale or scale means 172. As best shown in Fig. 1, the total scale 72 is anchored by means of a link 173 pivotally connected to the scale and to a support 174. The links 151 to 156 at the rearward ends of the respective bars 131 to 136 are pivotally connected at their upper ends to a beam or beam means 175 which is pivotally mounted on a fulcrum or fulcrum means 176. The beam 175 is pivotally connected to and supported by a fineness modulus scale or indicator 177 which is anchored by pivotally connecting it to a support 178. The link 157 at the rearward end of the bar 137, to which is connected the scale or percentage indicator 97 for the fraction on the conveyor 87 derived from the pan 67, is anchored by being pivotally connected to a support 179.

Preferably, the links 121 to 127 supporting the scales or percentage indicators 91 to 97, respectively, are pivotally connected to the bars 131 to 137, respectively, at the midpoints of such bars so that one-half the load applied to each bar is applied to the shaft 168 to produce a torque and the remaining half is supplied to the beam 175 to produce a moment. Equally splitting the loads in this manner is not essential and the loads applied to the bars 131 to 137 may be otherwise split if desired.

Considering the over-all operation of the embodiment presently under consideration as thus far described, the splitting means 21 splits off a sample stream from the main stream as hereinbefore discussed and delivers the sample stream to the screen system 24, either directly or through the dryer 54. For the moment, it will be assumed that the sample stream is constant, or that any variations in the volume of the sample stream have been compensated for, means for maintaining the sample stream constant, or for compensating for any variations in the volume of the sample stream, being described hereinafter. The screen system 24 separates the sample stream into fractions which are substantially continuously delivered to the respective conveyors 81 to 87. Thus, the scales or percentage indicators 91 to 97 indicate the percentages of the individual fractions by weight. As indicated previously, the indicators 91 to 97 are preferably calibrated in terms of percentage so that the percentage of any fraction may be determined readily without conversion. Thus, the operator of the apparatus may determine at a glance the percentage of any desired fraction, which is an important feature.

Since the scales or percentage indicators 91 to 97 are connected to the bars 131 to 137 between the ends thereof as hereinbefore discussed, part of the weight of each fraction produces a torque on the shaft 168 which is proportional to the weight of such fraction. The torques corresponding to the fractions on the conveyors 81 to 87 are summed up with the arrangement described and are opposed by the total scale 172. Thus, the reading of the total scale 172 is proportional to the total of the readings of all of the individual scales or percentage indicators 91 to 97. Preferably, the total scale 172 is calibrated in percentage in such a manner that it reads the total of the percentages indicated by the percentage indicators 91 to 97, viz., one hundred percent (100%).

Thus, the operator is provided with a check on the operation of the apparatus since, as long as the total percentage indicator 172 registers one hundred percent (100%), the individual percentage indicators 91 to 97 are registering the percentages of the fractions correctly. As previously suggested, any variations in the volume of the sample stream would tend to vary the indication of the total percentage indicator 172, but such variations are either eliminated or compensated for by means to be described hereinafter.

Considering now the operation of the beam 175 and the fineness modulus indicator 177, it will be recalled that, in accordance with the arbitrary standards hereinbefore discussed for arriving at a value of fineness modulus, it is necessary to weight the coarsest fraction by a factor of six, the next fraction by a factor of five, and so forth down to the finest fraction, i. e., the fraction retained by the pan 67, which is weighted by a factor of zero. In order to so weight the fractions, the bar 131 corresponding to the coarsest fraction is connected to the beam 175 a distance of six units from the fulcrum 176, the bar 132 corresponding to the next fraction is connected to the beam a distance of five units from the fulcrum, the beam 133 corresponding to the next fraction is connected to the beam 175 a distance of four units from the fulcrum, and so forth down to the bar 137 corresponding to the finest fraction retained by the pan 67, which is not connected to the beam 175 at all, but which is dead-ended by connecting it to the support 179. Thus, the coarsest fraction applies to the beam 175 a moment which is weighted by a factor of six, the next fraction applies to the beam a moment which is weighted by a factor of five, and so forth down to the finest fraction, which, being dead-ended, applies no moment to the beam.

The weighted or adjusted moments corresponding to the first six fractions are opposed by the fineness modulus indicator or scale 177, which thus indicates the fineness modulus of the material, or a value proportional thereto, depending upon the units in which the device is calibrated. Preferably, the fineness modulus indicator 177 is calibrated directly in terms of fineness modulus so that the fineness modulus of the material may be read directly.

Thus, it will be seen that this embodiment of the invention automatically and continuously registers the fineness modulus of the material, the unweighted or unadjusted values of the fractions, preferably in percentages, and the total of the unweighted values of the fractions, also preferably in percentage. Thus, readings of these quantities may be obtained continuously and entirely automatically, which is an important feature of the invention.

As hereinbefore discussed, it is necessary to maintain the reading of the total scale 172 constant in order for the readings of the percentage indicators 91 to 97 to be accurate. Also, the reading of the total scale 172 must be maintained constant for the reading of the fineness modulus indicator 177 to be accurate. Otherwise, readings of the percentages indicators 91 to 97 and of the fineness modulus indicator 177 would have to be corrected to compensate for variations in the reading of the total scale 172 from the prescribed value. Since the total scale 172 is preferably calibrated in percentage so that it acts as a total percentage indicator as hereinbefore discussed, its reading is preferably maintained constant at one hundred percent (100%) to avoid any necessity for correcting the readings of the individual percentage indicators 91 to 97 and the fineness modulus indicator 177.

The reading of the total scale or total percentage indicator 172 may be maintained constant either by compensating for variations in the volume of the sample stream, or by maintaining the volume of the sample stream constant so as to eliminate such variations therein. Means for compensating for the effects of volume variations in the sample stream in a manner to maintain the reading of the total percentage indicator 172 constant is illustrated in Figs. 7 to 9 and will be considered first as a matter of convenience.

Figure 7:
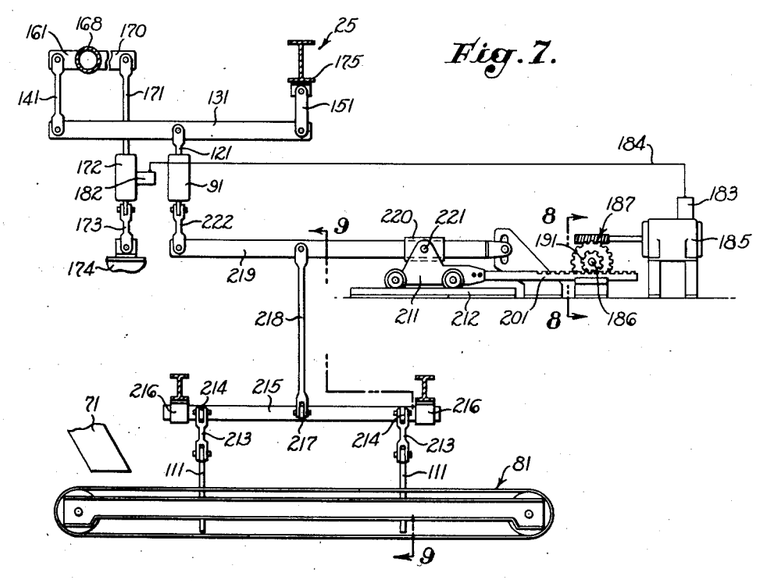
Fig. 7 is a semi-diagrammatic view illustrating means for compensating for variations in the flow of material to the embodiment illustrated in Figs. 1 to 6, such means being in the nature of an addition to the embodiment of Figs. 1 to 6.
Figure 8:
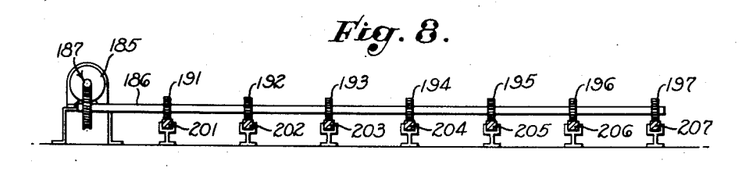
Figs. 8 and 9 are fragmentary sectional views respectively taken as indicated by the arrowed lines 8—8 and 9—9 of Fig. 7.
Figure 9:
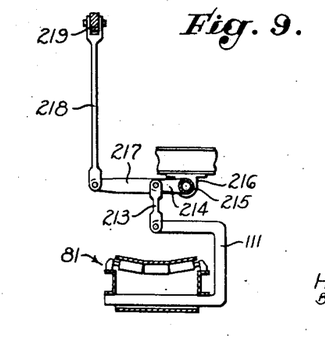

Referring to Figs. 7 to 9 of the drawings, connected to the total percentage indicator 172 so as to be controlled thereby is a master synchro 182, the rotor of such synchro being connected to the indicator shaft of the total percentage indicator. The master synchro 182 controls a slave synchro 183, the electrical connections therebetween, which are well known in the art, being diagrammatically represented by the line 184. The slave synchro 183 is operatively connected to a reversible motor 185 to control the direction of rotation of such motor in response to variations in the reading of the total percentage indicator 172 from some predetermined value, such as one hundred percent (100%). In other words, if the reading of the total percentage indicator 172 tends to rise above one hundred percent (100%), the synchro system energizes the reversible motor 185 for rotation in one direction and, conversely, if the reading of the total percentage indicator tends to drop below one hundred percent (100%), the motor 185 is energized in the opposite direction.

The motor 185 drives a shaft 186 through a worm and wheel arrangement 187. Fixed on the shaft 186 are gears 191 to 197 which are meshed with racks 201 to 207, respectively, the gears 191 to 197 and the racks 201 to 207, corresponding to the conveyors 81 to 87, respectively, which receive the fractions separated by the screen system 24.

Connected to and controlled by each of the racks 201 to 207 is a movable fulcrum, only the fulcrum associated with the rack 201 being illustrated in the drawings since they are all identical. This fulcrum is identified by the numeral 211 in Fig. 7 of the drawings, and is illustrated as movable on a track 212.

As best shown in Fig. 9, the hangers 111 for supporting the conveyor 81 associated with the rack 201 and the movable fulcrum 211 controlled thereby are connected by means of links 213 to arms 214 extending radially from a shaft 215 rotatable in bearings 216. The shaft 215 is provided with another radial arm 217 to which is pivotally connected a link 218, the latter being pivotally connected at its upper end to an intermediate point on a beam 219 which is pivotally carried by the movable fulcrum 211, the latter being movable relative to the beam 219 to change the fulcrum point of such beam. In order to permit such movement of the fulcrum 211 relative to the beam 219, the beam is provided with a slidable collar 220 which is pivotally connected to the fulcrum by a pin 221. As will be noted, the movable fulcrum 211 is located on one side of the point of pivotal connection of the link 218 to the beam 219, the beam 219 being connected to the individual percentage indicator 91 corresponding to the conveyor 81 on the opposite side of such point by a link 222. As previously described, the percentage indicator 91 is pivotally connected to the corresponding bar 131 by the link 121. Thus, the various elements just described for connecting the hangers 111 for supporting the conveyor 81 to the percentage indicator 91 have been substituted for the simple link 101 previously described.

Considering the operation of the structure shown in Figs. 7 to 9 of the drawings, it will be apparent that the position of the movable fulcrum 211 determines the load applied to the indicator 91 for indicating the percentage of the fraction retained by the screen 61 and delivered to the conveyor 81 through the chute 71. The loads applied to the remaining percentage indicators 92 to 97 similarly depend upon the positions of similar movable fulcrums, not shown, controlled by the racks 202 to 207, all such movable fulcrums being operated simultaneously since the racks connected thereto are all controlled by the same shaft 186. As previously discussed, the shaft 186 is driven by the reversible motor 185, this shaft being driven in one direction by the reversible motor in the event that the reading of the total percentage indicator 172 rises above one hundred percent (100%), and being driven in the other direction in the event that such reading falls below one hundred percent (100%). Consequently, whenever the reading of the total percentage indicator 172 tends to deviate from one hundred percent (100%), the reversible motor 185 adjusts the positions of all of the movable fulcrums associated with the conveyors 81 to 87 and the individual percentage indicators 91 to 97 in unison to maintain the reading of the total percentage indicator substantially constant at one hundred percent (100%).

Thus, any variations in the volume of the sample stream delivered to the screen system 24 are compensated for so that they do not affect the percentage indications of the individual percentage indicators 91 to 97 and the total percentage indicator 172, except to the slight extent necessary to actuate the synchro system controlling the reversible motor 185. Thus, the individual percentage indicators 91 to 97 always indicate the correct percentages of the various fractions without any necessity for applying any correction factors thereto to compensate for deviations in the reading of the total percentage indicator 172 from one hundred percent (100%). Also, this system at the same time adjusts the weighted values of the moments applied to the fineness modulus beam 175 to compensate for any variations in the volume of the sample stream delivered to the screen system 24 so that the fineness modulus indicator 177 always correctly indicates the fineness modulus without any necessity for applying corrections to the readings of the fineness modulus indicator.

It will be noted that if the indicators 91 to 97 and 172 were calibrated in units of weight, instead of in terms of percentage, the compensating system just described would result in weight indications which might not be correct, but which would always be proportional to the correct values. However, if the indicators 91 to 97 and 172 are calibrated in terms of percentage, which is preferable, this is of no consequence.

Figures 10, 11, 12, 13:
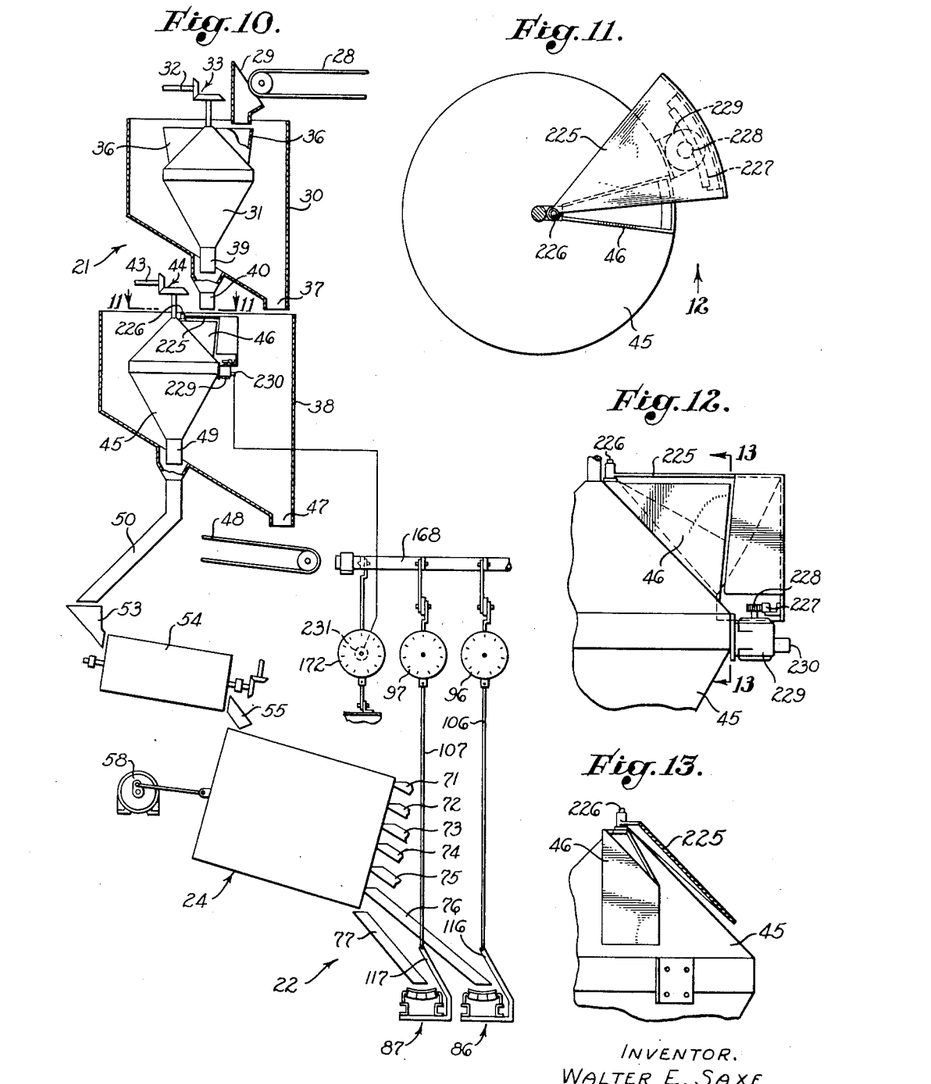
Fig. 10 is a semi-diagrammatic elevation duplicating a portion of Fig. 1 and illustrating an alternative embodiment of the means illustrated in Figs. 7 to 9.
Fig. 11 is a fragmentary sectional view on an enlarged scale which is taken as indicated by the arrowed line 11—11 of Fig. 10.
Fig. 12 is a fragmentary elevation of the structure illustrated in Fig. 11 and is taken in the direction indicated by the arrow 12 of Fig. 11.
Fig. 13 is a fragmentary sectional view taken as indicated by the arrowed line 13—13 of Fig. 12.

In Figs. 10 to 13 of the drawings, an alternative means for maintaining the reading of the total percentage indicator 172 constant is illustrated, this means maintaining the reading of the total percentage indicator constant by maintaining substantially constant the volume of the sample stream delivered to the screen system 24. Considering how this is accomplished, the sector-shaped compartment 46 on the lower splitter 45 is provided with a cover 225 which is pivoted at 226 adjacent the apex of such compartment so that the position of such cover determines the effective angle of such compartment and thus determines the percentage of sand discharged by the spout 40 which is split off by the lower splitter 45. In order to conform to the slope of the conical upper end of the splitter 45, the cover 225 is similarly inclined, as best shown in Fig. 13.

Thus, it will be seen that, by varying the position of the cover 225 to vary the effective angle of the sector-shaped compartment 46, any variations in the sample stream delivered to the screen system 24 may be avoided so as to maintain such sample stream substantially constant. Considering the manner in which the position of the cover 225 is controlled, connected to the pivoted cover is an arcuate rack 227 with which is meshed a gear 228 on the shaft of a reversible motor 229. The direction of rotation of this motor is controlled by a slave synchro 230 which is, in turn, controlled by a master synchro 231 operatively connected to the total percentage indicator 172, as by connecting the rotor of such master synchro to the indicator shaft of such indicator.

Thus, if the reading of the total percentage indicator 172 tends to rise above one hundred percent, which reflects an increase in the volume of the sample stream delivered to the screen system 24, the synchro system connected to the reversible motor 229 energizes such motor in a direction to move the cover 225 toward a closed position so as to decrease the effective angle of the sector-shaped compartment 46. Conversely, if the volume of the sample stream decreases, the reading of the total percentage indicator 172 tends to drop below one hundred percent, whereupon the synchro system energizes the reversible motor 229 in the opposite direction to open the cover 225 so as to increase the effective angle of the sector-shaped compartment 46. Thus, the position of the cover 225 is continuously adjusted in response to any variations in the reading of the total percentage indicator 172 from one hundred percent so as to maintain the volume of the sample stream substantially constant, thereby maintaining the reading of the total percentage indicator substantially constant at one hundred percent.

It will be noted that this system may have some lag because of the fact that the total percentage indicator 172 is located a considerable distance downstream from the splitter 45. However, variations in the volume of the main stream delivered to the apparatus by the conveyor 28 are ordinarily relatively small so that such lag is not of much consequence. However, if it is desired to eliminate such lag, a scale, not shown, responsive to the weight of material on the conveyor 28, for example, may be employed to control the synchro system connected to the reversible motor 229, the master synchro 231 being operatively connected to such scale in the same manner as it is operatively connected to the total percentage indicator 172.

Figure 14:
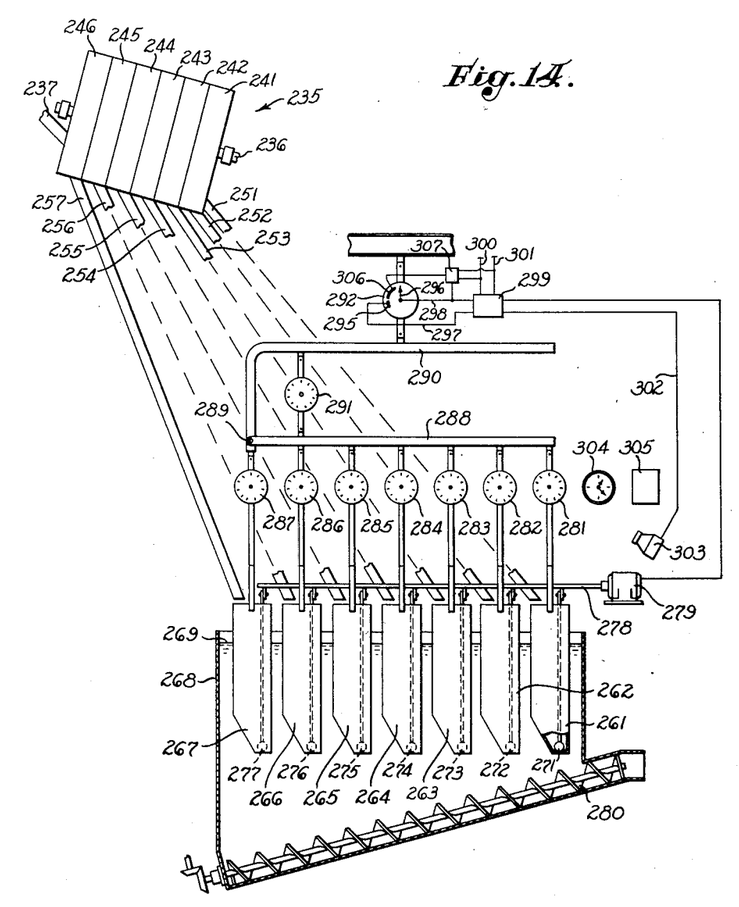
Fig. 14 is a semi-diagrammatic elevation of a second embodiment of an apparatus of the invention for automatically measuring the fineness modulus of a material such as sand.

Turning now to Fig. 14 of the drawings, the embodiment of the invention which is illustrated therein is adapted to determine the fineness modulus of wet sand by weighing the fractions under water, and includes an automatic recording system for periodically recording the percentages of the individual fractions, the fineness modulus of the sand, and so forth. This embodiment is completely described, and various features thereof are claimed, in my copending application Serial No. 213,015, filed February 27, 1951 and now abandoned, so that it will not be considered in complete detail herein.

In general, the embodiment of Fig. 14 includes a screen system having the form of a cylindrical trommel 235 which is rotated about the axis of its shaft 236 in any suitable manner, not shown. A stream of wet sand is delivered to the trommel 235 through a chute 237, such stream of sand being obtained in any suitable manner, as by a splitting means, not shown, similar to the splitting means 21 previously described.

The trommel 235 includes a series of screens 241 to 246 having the form of annular bands which define the periphery of the trommel, the screen 246 being at the inlet end of the trommel and the screen 241 being at the outlet end thereof. In accordance with the arbitrary standards hereinbefore discussed, the screens 241, 242, 243, 244, 245 and 246 are four-mesh, eight-mesh, sixteen-mesh, thirty-mesh, fifty-mesh and one hundred-mesh screens, respectively. The fractions retained by the screens 241 to 246 discharge into chutes 251 to 256, respectively, and the finest fraction, which passes through the one hundred-mesh screen 246, discharges into a chute 257.

Considering the operation of the trommel 235, it will be apparent that since the sand entering the trommel falls onto the one hundred-mesh screen 246 first, the finest fraction of the sand, corresponding to the fraction which was retained by the pan 67 previously described, passes through the screen 246 into the chute 257. From the screen 246, the sand retained by the one hundred-mesh screen passes onto the fifty-mesh screen 245 and the second fraction, considered in the order of increasing coarseness, passes through the screen 245 into the chute 256, this second fraction corresponding to the fraction retained by the one hundred-mesh screen 66 previously described. Similarly, the third fraction, considered in the order of increasing coarseness, passes through the screen 244 into the chute 255, the fourth fraction passes through the screen 243 into the chute 254, the fifth fraction passes through the screen 242 into the chute 253, the sixth fraction passes through the screen 241 into the chute 252, and the seventh fraction is retained by the screen 241 and discharges into the chute 251.

The chutes 251 to 257 deliver the fractions discharged thereinto to receptacles 261 to 267, respectively. These receptacles are disposed in a tank 268 which is adapted to be filled with water to a level 269 so that the fractions discharged into the receptacles may be weighed under water to compensate for any moisture therein. However, if the sand is dry, the water may be omitted. the receptacles 261 to 267 are provided with dump valves 271 to 277 which are connected to a shaft 278 driven by a motor 279, the sand dumped into the tank 268 upon opening of the dump valves 271 to 277 being removed by a screw conveyor 280.

The receptacles 261 to 267 are operatively connected to scales 281 to 287, respectively, the receptacles being shown as suspended from the scales for purposes of illustration. Preferably, the scales 281 to 287 are calibrated in terms of percentage so that the indicate the percentages of the various fractions when read as hereinafter described.

Located above the scales 281 to 287 is a beam or beam means 288 to which the scales 281 to 286 are pivotally connected, one end of this beam being pivotally connected at 289 to a hanger 290 to which the scale 287 is pivotally connected so that the weight of the finest fraction is not applied to the beam 288. Since, in accordance with the arbitrary standards hereinbefore discussed, the coarsest fraction is weighted by a factor of six in determining fineness modulus, the second fraction, in the order of decreasing coarseness, is weighted by a factor of five, the third fraction is weighted by a factor of four, and so forth, the scale 281 is pivotally connected to the beam 288 a distance of six units from the pivot or fulcrum 289, the scale 282 is connected thereto a distance of five units from the fulcrum, the scale 283 is connected thereto a distance of four units from the fulcrum, and so forth. Since the weight of the finest fraction does not enter into the fineness modulus, the scale 287 is not connected to the beam 288, but, as previously described is connected to the hanger 290. Thus, this system weights the values of the fractions by factors ranging from six down to zero in the order of decreasing coarseness, the values of the fractions adjusted or weighted in this manner being totaled by a scale 291 which is preferably calibrated in terms of fineness modulus. Thus, the fineness modulus may be read directly, which is an important feature.

The hanger 290 is operatively connected to a total scale 292, the hanger 290 being illustrated as supported by the scale 292 for purposes of illustration. As will be apparent, the total scale 292 is thus responsive to the total of the unweighted values of the fractions in the receptacles 261 to 267. Preferably, the scale 292 is calibrated in terms of percentage so that it serves as a total percentage indicator.

As will be apparent, since the embodiment under consideration is, in effect, a batch system, the percentage indicators 281 to 287 will not indicate the percentages of the various fractions, and the fineness modulus indicator 291 will not indicate the fineness modulus of the sand, until the quantity of sand for which the system is designed has passed through the trommel 235 into the receptacles 261 to 267. Thus, it is necessary to read the individual percentage indicators 281 to 287 and the fineness modulus indicator 291 when a predetermined reading is attained on the indicator 292, this reading preferably being one hundred percent, for example. Thus, when the total percentage indicator 292 indicates one hundred percent, the percentage indications on the indicators 281 to 287 are the percentages of the individual fractions, and the indication on the fineness modulus indicator 291 is the fineness modulus of the sand.

The embodiment of the apparatus illustrated in Fig. 14 includes means for photographically recording the readings of the individual percentage indicators 281 to 287, the fineness modulus indicator 291 and the total percentage indicator 292 when the reading of the latter reaches one hundred. In order to accomplish this, the indicator 292 is provided with a contact 295 thereon which is engageable by the pointer 296 of the indicator, such contact being opposite the one hundred percent point of the dial of the indicator. Conductors 297 and 298 respectively connect the contact 295 and the pointer 296 to a switching relay 299 which receives power from input leads 300 and 301. When the relay 299 is energized by engagement of the pointer 296 with the contact 295, it closes a circuit 302 to an electrically operated camera 303 which is positioned to photograph the individual percentage indicators 281 to 287, the fineness modulus indicator 291 and the total percentage indicator 292. Also, for a complete record, a clock 304 and a calendar 305 are preferably placed in the field of the camera. Thus, when the one hundred percent mark on the total percentage indicator 292 is reached, the camera photographs the indicators 281 to 287, 291 and 292, the clock 304 and the calendar 305 to obtain a record of the individual percentages of the fractions, the total percentage thereof, and the fineness modulus of the sand, which record is identified by date and time of day. By correlating the photographic records thus obtained with other records indicating the point of storage to which sand tested by this apparatus on a particular day at a particular time was being delivered, the percentages of the fractions of such sand and the fineness modulus thereof may readily be determined.

The motor 279 for operating the dump valves 271 to 277 is also connected to the relay 299 so that the latter energizes such motor at the same time that it actuates the camera 303. When energized, the motor 279 rotates the shaft 278 to raise the dump valves, whereby to discharge the sand fractions from the receptacles 261 to 267 preparatory to another operating cycle. The dump valves may be permitted to return to their closed positions by gravity, or otherwise.

Preferably, the total percentage indicator 292 is provided with a second contact 306 above the one hundred percent mark on the dial thereof, this contact being adapted to energize a warning device 307 in the event that the dump valves 271 and 277 fail to operate, in which case the pointer 296 of the total percentage indicator 292 will move upwardly beyond one hundred percent to close the circuit to the warning device. This immediately advises the operator that the apparatus requires his attention.

Considering the over-all operation of the embodiment illustrated in Fig. 14, the sand whose fineness modulus is to be determined is delivered to the trommel 235 either continuously or intermittently. The trommel separates the fractions of the sand from each other and delivers such fractions to the respective receptacles 261 to 267, the fractions being weighed under water to compensate for any moisture therein. When the reading of the total percentage indicator 292 reaches one hundred percent, or any desired value for which the apparatus is designed, the camera is actuated to photographically record the readings of the individual percentage indicators 281 to 287, the fineness modulus indicator 291, the total percentage indicator 292, the clock 304 and the calendar 305 to obtain a complete record. At the same time, the motor 279 opens the dump valves 271 to 277 to dump the fractions from the receptacles into the tank 268, such sand being conveyed from the tank by the screw conveyor 280. As soon as the dump valves close, the foregoing cycle of events is repeated so that periodic readings are obtained.

In the embodiments hereinbefore described, the means for weighting the values of the fractions which are totaled to obtain the fineness modulus include, in addition to the screen systems for separating the fractions from each other, means for multiplying the values of the fractions by different weighting factors. However, in the embodiment illustrated in Fig. 15 of the drawings, a screen system 310 is disclosed which automatically weights the values of the various fractions.

Figure 15:
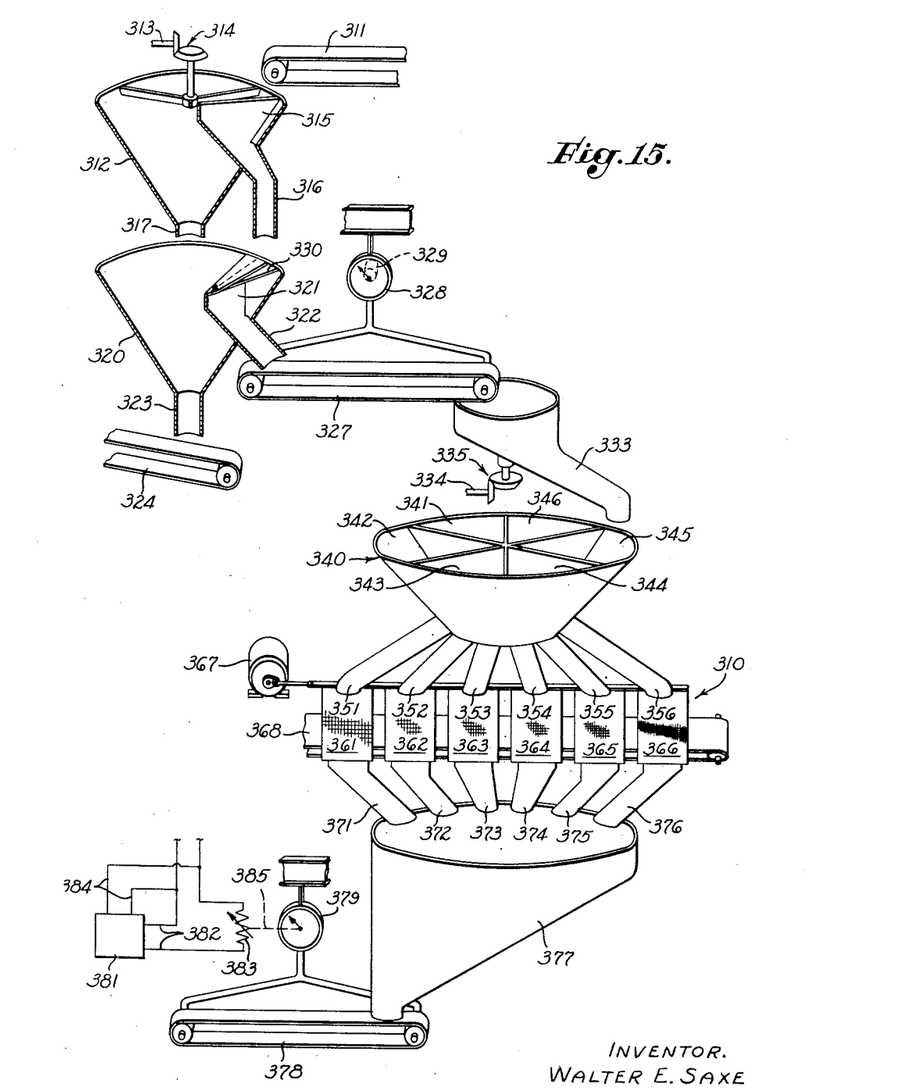
Fig. 15 is a semi-diagrammatic perspective view of a third embodiment of such an apparatus.

Referring to Fig. 15, the embodiment illustrated therein includes a conveyor 311 for delivering a substantially continuous stream of sand to a rotatable splitter 312 having the form of a hopper which may be driven by a shaft 313 through gearing 314. The splitter 312 is provided with a sector-shaped compartment 315 which discharges into an offset spout 316. Thus, for each revolution of the splitter 312, part of the sand delivered by the conveyor 311 enters the compartment 315 and is discharged through the offset spout 316, the residue being discharged from the splitter through a central spout 317. Below the splitter 312 is a hopper 320 into which both the offset spout 316 and the central spout 317 of the splitter 312 discharge. The hopper 320 is provided with a sector-shaped compartment 321 which discharges into an offset spout 322. Thus, for each revolution of the splitter 312, part of the sand discharged by the offset spout 316 thereof enters the compartment 321 in the hopper 320 and is discharged through the offset spout 322. The residue, including the sand which is discharged into the hopper 320 through the central spout 317 of the splitter 312 and the sand discharged thereinto by the offset spout 316 thereof, is discharged through a central spout 323 of the hopper 320 onto a conveyor 324 which transports the residue to a suitable point of disposal or storage. Thus, the structure described constitutes a splitting means, generally similar to the splitting means 21 described previously, for splitting off a sample stream from the stream delivered by the conveyor 311. As hereinbefore discussed, the sample stream may be rendered substantially continuous by running the splitter 312 at a relatively high speed and/or by increasing the number of compartments 315 and 321.

The sample stream is discharged onto a conveyor 327 by the spout 322, a scale 328 being operatively connected to the conveyor 327 and being shown as supporting such conveyor for purposes of illustration. In order to maintain the sample stream substantially constant so as to avoid the effects of variations in the volume thereof which were described previously, the scale 328 operates a master synchro 329 which controls the position of a pivoted cover 330 on the sector-shaped compartment 321. The connections between the master synchro 329 and the cover 330 may be the same as previously described in connection with Figs. 10 to 13 of the drawings and are not shown in Fig. 15 to avoid unnecessary duplication. Thus, the position of the cover 330 is continually adjusted in response to any tendency of the reading of the scale 328 to deviate from some prescribed value so as to maintain the volume of the sample stream substantially constant for the purposes hereinbefore discussed in detail.

The substantially constant sample stream on the conveyor 327 is delivered to a rotatable spout 333 which may be driven by a shaft 334 through gearing 335, for example. The rotatable spout 333 discharges the sample stream into a hopper 340 having six equal, sector-shaped compartments 341 to 346. This arrangement divides the sample stream into six equal streams which are discharged through chutes 351 to 356, respectively, onto inclined screens 361 to 366, respectively. These screens form the screen system 310 and may be vibrated by a vibrating device 367, for example. A conveyor 368 below the screens 361 to 366 conveys away to a suitable point of disposal or storage any fractions passing through the screens, the fractions retained by the screens 361 to 366 being discharged through chutes 371 to 376, respectively, into a common hopper 377 which discharges onto a conveyor 378. The latter is operatively connected to a scale 379 and is illustrated as being suspended therefrom for purposes of illustration.

In accordance with the standards hereinbefore discussed for arbitrarily arriving at a number which is termed the fineness modulus of the sand, six screens 361 to 366 are employed and the sample stream is split into six equal amounts by the hopper 340 for delivery to the respective screens. The screens 361 to 366 differ in mesh, the screen 361 being a four-mesh screen, the screen 362 an eight-mesh screen, the screen 363 a sixteen-mesh screen, the screen 364 a thirty-mesh screen, the screen 365 a fifty-mesh screen, and the screen 366 being a one hundred-mesh screen. Considering the sand fractions in the order of decreasing coarseness, it will be apparent that the screen 361 retains the first fraction, i. e., the first fraction of the amount of sand delivered thereto, the screen 362 retains the first and second fractions, the screen 363 retains the first, second and third fractions, the screen 364 retains the first, second, third and fourth fractions, the screen 365 retains the first, second, third, fourth and fifth fractions, and the screen 366 retains the first, second, third, fourth, fifth and sixth fractions. All of the sand passing through the screens 361 to 366, including the finest fraction passing through the screen 366, is removed by the conveyor 368. Thus, since the fractions retained by the screens 361 to 366 are mixed together in the hopper 377 and weighted together by the scale 379, it will be apparent that the weight of the first fraction, considered in the order of decreasing coarseness is added in six times, the weight of the second fraction is added in five times, the weight of the third fraction is added in four times, and so forth. The seventh, or finest, fraction considered in the previous embodiments is discarded so that, in effect, it is assigned a weight of zero. Thus, the screen system 310 weights or adjusts the first six fractions, considered in order of decreasing coarseness, in the same manner as hereinbefore discussed, but without the use of any multiplying mechanism, which is an important advantage of this embodiment.

As will be apparent, the scale 379 registers the total of the weighted values of the fractions, which total is proportional to the fineness modulus of the sand. Preferably, the scale 379 is calibrated directly in terms of fineness modulus so that it reads the fineness modulus directly.

In order to provide a record from which the average fineness modulus throughout a given period of time may be determined, I employ a watthour meter 381 in conjunction with the scale or fineness modulus indicator 379. Connected in series with one of a pair of leads 382 is a variable resistor 383, the leads 382 being connected to either the current or voltage terminals of the watthour meter. Leads 384 are connected to the other terminals thereof. The variable resistor is controlled by the fineness modulus indicator 379, as by being connected to the indicator shaft as indicated by the broken line connection 385.

As will be apparent, so long as the fineness modulus of the sand being tested remains constant, the watthour meter 381 records at a constant rate. However, if the fineness modulus increases, the fineness modulus indicator 379 reduces the value of the variable resistor 383 to correspondingly increase the recording rate of the watthour meter. Conversely, if the fineness modulus decreases, the recording rate of the watthour meter is decreased correspondingly. Thus, the number of kilowatt hours recorded by the watthour meter 381 in a given number of hours may be divided by the number of hours and the result converted to fineness modulus to obtain the average fineness modulus for such period of hours. For example, the apparatus may be so designed that a fineness modulus of 2.5 causes the watthour meter 381 to record 2.5 kilowatts per hour, in which case no conversion of the watthour meter reading to fineness modulus is necessary, which is an important feature.

It will be noted that the embodiment of the invention illustrated in Fig. 15 of the drawings makes no provision for measuring the percentages of the individual fractions. However, means for measuring the percentages of the individual fractions may be added to the embodiment of Fig. 15, such a means being illustrated in Fig. 16 of the drawings. Referring thereto, the chutes 371 to 376 from the screens 361 to 366, respectively, discharge onto receptacle means or conveyors 391 to 396, respectively, instead of into a hopper as in Fig. 15. The conveyors 391 to 396 operate continuously at the same speed and discharge into a hopper 397 which, in turn, discharges onto a conveyor 398 operatively connected to a scale 399 which serves as a fineness modulus indicator, preferably being calibrated in terms of fineness modulus.

Figure 16:
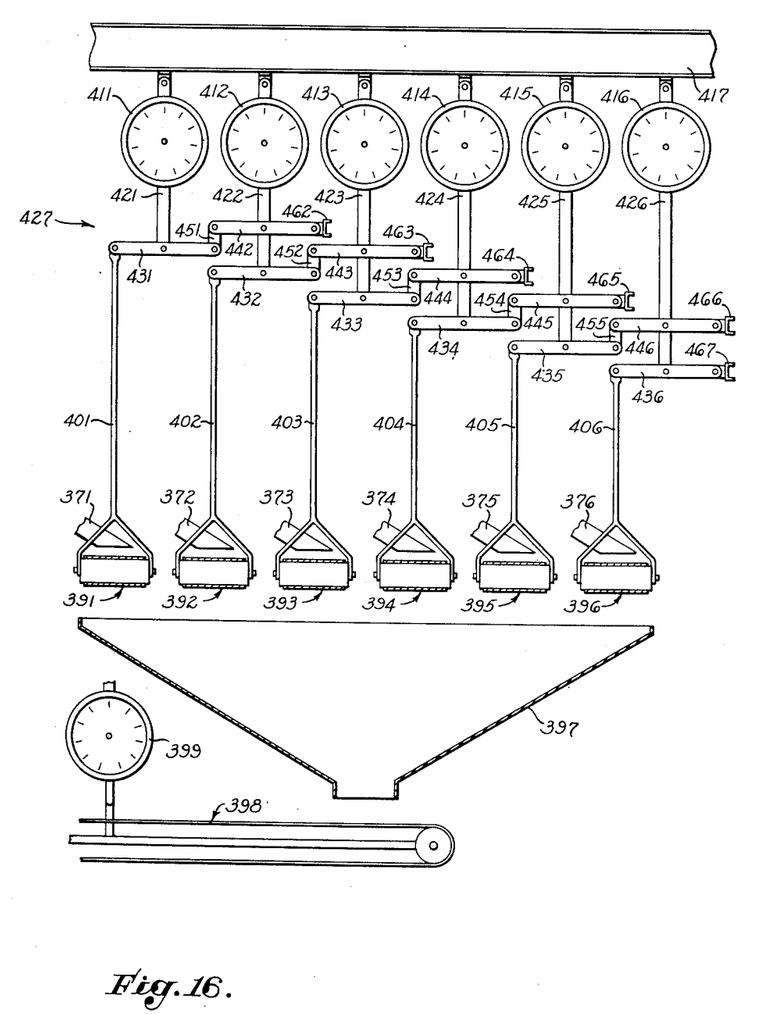
Fig. 16 is a semi-diagrammatic elevation of means for indicating the fineness modulus of a material such as sand and means for indicating the values of the individual fractions of the material, the latter means being in the nature of an addition to the embodiment of Fig. 15.
Figure 17:
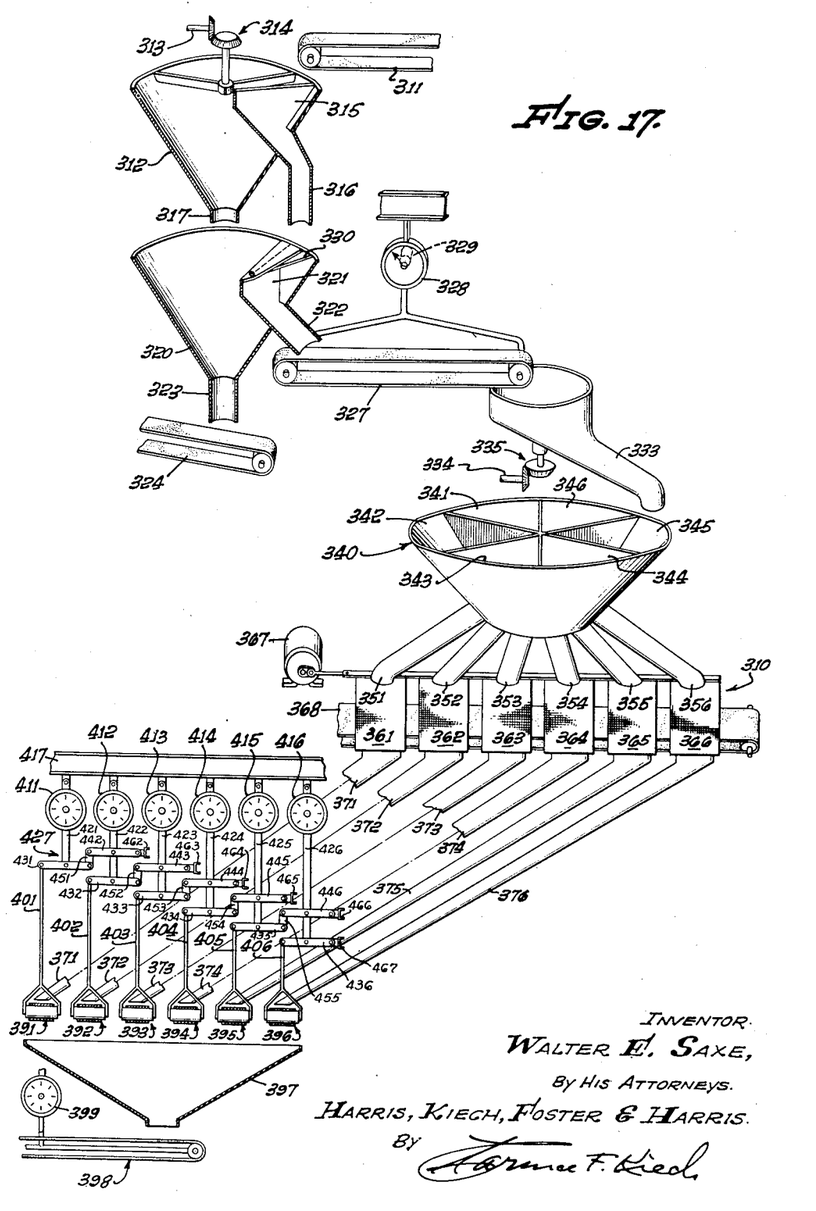
Fig. 17 is a semi-diagrammatic view of Figs. 15 and 16.

The conveyors 391 to 396 are illustrated as suspended by links 401 to 406, respectively, and associated with the conveyors 391 to 396 are scales 411 to 416, respectively. The scales are preferably calibrated in terms of percentage and are illustrated as supported by a beam 417. Depending from the scales or percentage indicators 411 to 416 are draft links 421 to 426, respectively. The links 401 to 406 supporting the conveyors 391 to 396 are connected to the respective draft links 421 to 426 by linkage means 427 for subtracting from the sum of the values of all of the fractions which are retained by each screen, the sum of the values of the fractions which are coarser than the finest fraction retained by said screen, whereby to obtain on the percentage indicators 411 to 416 the percentages of the finest fractions retained by the respective screens.

Considering the linkage means 427 more particularly, it includes levers 431 to 436 respectively pivotally connected to the draft links 421 to 426, and includes levers 442 to 446 respectively pivotally connected to the draft links 422 to 426 and spaced from the levers 432 to 436, respectively. Preferably, the various levers 431 to 436 and 442 to 446 are connected to the respective draft links at the midpoints of the levers to provide 1:1 ratios, although other ratios may be employed. One end of each of the levers 431 to 436 is pivotally connected to the corresponding one of the links 401 to 406. The other ends of the levers 431 to 435 are pivotally connected to the levers 442 to 446, respectively, by links 451 to 455, respectively, each of these links being pivotally connected to the corresponding one of the levers 442 to 446 at one end thereof. The other ends of the levers 442 to 446 are pivotally connected to fixed supports 462 to 466, respectively, and the other end of the lever 436 is pivotally connected to a fixed support 467.

Considering the operation of the structure illustrated in Fig. 16 of the drawings, it will be recalled that, in the order of decreasing coarseness of the sand fractions, the screen 361 retains the first fraction and delivers it to the conveyor 391 through the chute 371, the screen 362 retains the first two fractions and delivers them to the conveyor 392 through the chute 372, the screen 363 retains the first three fractions and delivers them to the conveyor 393 through the chute 373, the screen 364 retains the first four fractions and delivers them to the conveyor 394 through the chute 374, the screen 365 retains the first five fractions and delivers them to the conveyor 395 through the chute 375, and the screen 366 retains the first six fractions, i. e., all but the very finest fraction, and delivers them to the conveyor 396 through the chute 376. Thus, since the lever 431 is pivotally connected to the draft link 421 at the midpoint of such lever in the particular construction illustrated, twice the weight of the first fraction is applied to the percentage indicator 411, which is preferably so calibrated that it reads the percentage of the first fraction correctly. In other words, the dial of the percentage indicator 411 is so marked that it indicates the true percentage of the first fraction, even though twice the weight of the first fraction is applied to the indicator 411.

Since the lever 432 is pivotally connected at its midpoint to the draft link 422, it applies twice the total weight of the first two fractions on the conveyor 392 to the percentage indicator 412. Thus, the indicator 412 tends to indicate a percentage which is the sum of the percentages of the first two fractions. However, since the lever 431 is connected to the lever 442 by the link 451, twice the weight of the first fraction on the conveyor 391 is applied to the draft link 422 in the upward direction so that it cancels the effect of the force applied to the draft link 422 in the downward direction by the first fraction on the conveyor 392. In other words, twice the weight of the first fraction on the conveyor 391 is subtracted from twice the weight of the first fraction on the conveyor 392, these weights being equal since equal amounts of sand were delivered to the screens 361 to 366 originally. Thus, the net force acting downwardly on the draft link 422 is proportional to, i. e., is equal to twice, the weight of the second fraction on the conveyor 392. Thus, the percentage indicator 412 indicates only the percentage of the second fraction.

In a similar manner, twice the weights of the first and second fractions on the conveyor 392 are subtracted from twice the weights of the first, second and third fractions on the conveyor 393 so that only a force proportional to the weight of the third fraction on the conveyor 393, i. e., a force equal to twice the weight of the third fraction on the conveyor 393 is applied to the draft link 423. Thus, the percentage indicator 413 indicates only the percentage of the third fraction. Similarly, the indicators 414, 415 and 416 indicate only the percentages of the fourth, fifth and sixth fractions on the conveyors 394, 395 and 396, respectively.

Thus, the percentages of the fractions entering into the fineness modulus determination may be measured with the structure illustrated in Fig. 16, as well as the fineness modulus itself. It will be understood that in order to prevent variations in the volume of the sample stream delivered to the apparatus of Fig. 15 from affecting the percentage indications and the fineness modulus indications in the structure of Fig. 16, the volume of the sample stream must be maintained constant, or variations therein must be compensated for, as hereinbefore discussed.

Thus, my invention measures the fineness modulus of a material such as sand entirely automatically and, in addition, measures such other characteristics of the material as the percentages of the individual fractions thereof, also entirely automatically. It will be understood that although embodiments of the invention for measuring the fineness modulus of sand in accordance with the arbitrary standards hereinbefore discussed have been disclosed, the invention may be embodied in apparatuses for measuring the fineness modulus of sand or other materials in accordance with other standards. Consequently, it will be understood that the invention is not to be limited to the particular number of screens, screen meshes, weighting or adjusting factors, and the like hereinbefore discussed.

In view of the foregoing, I hereby reserve the right to all changes, modifications and substitutions as properly come within the scope of the invention.

I claim as my invention:

1. In an apparatus for continuously measuring the fineness modulus of a material such as sand which includes progressively finer fractions, the combination of: a plurality of screens of progressively finer mesh, each of said screens being adapted to retain one of said fractions and all coarser fractions; continuously-operating means for continuously delivering substantially equal streams of the material to said screens independently of each other; a conveyor; continuously-operating means for continuously delivering the fractions retained by said screens to said conveyor; continuously-operating means operatively connected to said conveyor for continuously totaling the fractions delivered to said conveyor from said screens to obtain the fineness modulus of the material, said totaling means including scale means for continuously weighing all of the fractions delivered to said conveyor from said screens; and wattmeter means responsive to variations in current or voltage inputs applied thereto, said wattmeter means having adjustable means in circuit therewith for varying one of said inputs, said adjustable means being operatively connected to said scale means so that variations in the fineness modulus of the material produce corresponding variations in said one input.

2. In an apparatus for continuously measuring the fineness modulus of a material such as sand having fractions of different finenesses, the combination of: a plurality of screens of different meshes adapted to retain the respective fractions and all coarser fractions; continuously-operating means for continuously delivering substantially equal streams of the material to said screens independently of each other, whereby said screens retain the respective fractions and all coarser fractions; and continuously-operating means for continuously weighing the fractions retained by all of said screens, said means for delivering substantially equal streams of the material to said screens including means for splitting a main stream of the material into substantially equal streams delivered to said screens, respectively, said apparatus further including means for delivering a main stream of the material to said splitting means, said means for delivering said main stream of the material to said splitting means including a delivery conveyor, scale means operatively connected to said delivery conveyor, and means operatively connected to and controlled by said scale means for delivering a substantially constant main stream of the material to said delivery conveyor.

3. In an apparatus for continuously measuring the fineness modulus of a material such as sand having fractions of different finenesses, the combination of: a plurality of screens of different meshes adapted to retain the respective fractions and all coarser fractions; continuously-operating means for continuously delivering substantially equal streams of the material to said screens independently of each other, whereby said screens retain the respective fractions and all coarser fractions; continuously-operating means for continuously weighing the fractions retained by all of said screens; and means for measuring the individual fractions retained by said screens, including linkage means for subtracting from the sum of the values of the fractions retained by each screen, the sum of the values of all of the fractions which are coarser than the finest fraction retained thereby so as to obtain the value of the finest fraction retained thereby.

4. In apparatus for continuously measuring the fineness modulus of material such as sand which includes a plurality of fractions of different finenesses, the combination of: a plurality of separate screens of different meshes; continuously-operating feed means for moving a separate stream of material from a common bulk supply directly onto and across each said separate screen to separate said material into different fractions and to deliver the retained fractions from the respective screens in continuous streams; and receiving means for receiving said continuous streams, said receiving means including means for totaling said fractions to obtain the fineness modulus of the material, and said receiving means including means for discharging material therefrom at a rate to maintain the quantity totaled thereby substantially constant.

5. Apparatus as defined in claim 4 wherein said means for totaling said fractions comprises means for combining and weighing said fractions.

6. Apparatus as defined in claim 5 wherein said receiving means comprises a continuously-operating conveyor arranged to support thereon a predetermined quantity of said fractions.

7. Apparatus as defined in claim 4 including separate scale means arranged to separately weigh each of said streams of material delivered from said screens.

8. Apparatus as defined in claim 7 including means interconnecting and modifying the action of said separate scale means whereby each scale produces an indication of the weight of only that portion of its stream constituting a single fraction of predetermined fineness.

References Cited in the file of this patent

UNITED STATES PATENTS

| | | |
|---|---|---|
| 1,100,793 | Stromborg | June 23, 1914 |
| 1,191,227 | Ramsay | July 18, 1916 |
| 1,989,003 | Dunagan | Jan. 22, 1935 |
| 2,264,223 | Stancliffe | Nov. 25, 1941 |

FOREIGN PATENTS

| | | |
|---|---|---|
| 304,495 | Italy | Jan. 9, 1933 |
| 389,604 | Great Britain | Mar. 23, 1933 |
| 425,930 | Great Britain | Mar. 25, 1935 |
| 611,203 | Germany | Mar. 23, 1935 |
| 729,612 | France | May 2, 1932 |